United States Patent
Schmulevitz

(10) Patent No.: US 9,603,382 B2
(45) Date of Patent: Mar. 28, 2017

(54) COOKED POULTRY PRODUCT AND METHOD OF MAKING THE SAME

(71) Applicant: Reuben Schmulevitz, Brooklyn, NY (US)

(72) Inventor: Reuben Schmulevitz, Brooklyn, NY (US)

(*) Notice: Subject to any disclaimer, the term of this patent is extended or adjusted under 35 U.S.C. 154(b) by 29 days.

(21) Appl. No.: 14/331,698

(22) Filed: Jul. 15, 2014

(65) Prior Publication Data

US 2016/0015070 A1  Jan. 21, 2016

(51) Int. Cl.
*A23G 9/28* (2006.01)
*A23L 13/50* (2016.01)
*A23L 5/10* (2016.01)

(52) U.S. Cl.
CPC .................. *A23L 13/55* (2016.08); *A23L 5/10* (2016.08)

(58) Field of Classification Search
CPC ...................................................... A23L 1/3152
See application file for complete search history.

(56) References Cited

U.S. PATENT DOCUMENTS

| | | | |
|---|---|---|---|
| 2,174,924 A | 10/1939 | McCleary | |
| 2,842,443 A | 7/1958 | Rice et al. | |
| 2,844,844 A * | 7/1958 | Sieczkiewicz | A22C 21/0069 452/135 |
| 3,260,239 A | 7/1966 | Sanders | |
| D251,282 S | 3/1979 | Lewis | |
| D253,025 S | 10/1979 | Lewis | |
| 4,285,980 A | 8/1981 | Lewis | |

* cited by examiner

*Primary Examiner* — Katherine D Leblanc
(74) *Attorney, Agent, or Firm* — Stephen E. Feldman; Feldman Law Group, P.C.

(57) ABSTRACT

A poultry product prepared by removing bones from a poultry carcass and compressing the remaining meat portion of the carcass into a mold. The mold is placed in an oven and the poultry product is cooked. Once cooked and removed from the mold, the poultry product retains an appearance of the mold which may be the shape of a traditionally-prepared poultry carcass. The poultry product can be wrapped and sold as a prepared food product.

2 Claims, 3 Drawing Sheets

US 9,603,382 B2

COOKED POULTRY PRODUCT AND METHOD OF MAKING THE SAME

BACKGROUND

Methods and apparatuses for butchering or otherwise obtaining meat from poultry are well-known in the art. However, in view of an increasing demand for fully-prepared food products for both commercial and home use, methods for obtaining increased amounts of meat from poultry carcasses and preparing the meat for consumption have become increasingly more desirable.

SUMMARY

The disclosed technology has successfully developed a fully-processed poultry product along with a method for preparing such a product. A poultry carcass can be deboned so that substantially all the meat of the whole carcass remains as a single piece. Once prepared in this fashion, the single piece is pressed in an oven mold and cooked. The cooked poultry product is removed from the mold. After removal, the cooked poultry product is in the shape of the mold and resembles a cooked bone-in poultry product. The fully-processed poultry product has wide commercial appeal.

In one implementation, a method of producing a cooked poultry product comprises the steps of: placing a semi-boneless turkey carcass into an oven mold, the oven mold having (1) a five-sided cooking container, (2) a lid with an upper mold assembly and (3) a lower mold assembly, wherein the lower mold assembly includes a first cavity for receiving a lower portion of the turkey carcass, the first cavity being in a shape of a lower portion of an in-bone turkey carcass; covering the lower mold assembly with the lid, wherein the lid includes a second cavity in a shape of an upper portion of a cooked, in-bone turkey; pressing the turkey carcass between the lid and the lower mold assembly; securing the lid onto the lower mold assembly; and heating the oven mold so as to cook the meat within a hollow portion created between the first cavity and the second cavity; wherein expansion of the meat in the oven mold due to cooking causes the meat to take the form of the hollow portion.

In some implementations, the method comprises the further step of removing the cooked meat from the mold, the cooked meat being in the form of a whole cooked bone-in turkey. This method can form a poultry product.

In some implementations, a cooked poultry product can be made by the steps of: placing a semi-boneless turkey carcass into an oven mold, the oven mold having (1) a five-sided cooking container, (2) a lid with an upper mold assembly and (3) a lower mold assembly, wherein the lower mold assembly includes a first cavity for receiving a lower portion of the turkey carcass, the first cavity being in a shape of a lower portion of an in-bone turkey carcass; covering the lower mold assembly with the lid, wherein the lid includes a second cavity in a shape of an upper portion of a cooked, in-bone turkey; pressing the turkey carcass between the lid and the lower mold assembly; securing the lid onto the lower mold assembly; and heating the oven mold so as to cook the meat within a hollow portion created between the first cavity and the second cavity, wherein expansion of the meat in the oven mold due to cooking causes the meat to take the form of the hollow portion.

DETAILED DESCRIPTION

The present invention relates to a poultry product and a Method of making thereof wherein bones of a poultry carcass are removed and the remaining meat portion of the carcass is compressed in a mold. The mold is placed in an oven and the poultry product is cooked. Once cooked and removed from the mold, the poultry product retains an appearance of a traditionally-prepared poultry carcass. The poultry product can be wrapped and sold as a prepared food product.

The disclosed technology prepares a poultry carcass so that the rib, breast bones, thigh bones and part of the wing bones are removed from the poultry carcass forming a single butchered cut. The method of making a semi-boneless poultry product can include separation of most of the bone structure from the poultry carcass with the optional exceptions of select bones, e.g., the drumstick bone or part of the wing bone. It is worthy to note that most or all of the meat normally provided by a fully bone-in product remains to form the semi-boneless poultry product.

Once butchered, the butchered cut can be marinated and compressed into an oven mold. The oven mold is capable of substantially sealing a marinade in with the butchered cut and also allows the butchered cut to be cooked within its own juices This process is generally described for preparing turkeys, but can be applied to any other form of poultry including, but not limited to, chickens, duck, goose, cornish hen, squab, and quail. In some implementations, the methods and products produced therefrom as practiced with any form of domestic animal or wild game wherein the carcass can be roasted or broiled as a whole. For example, a deboned pork cut can be compressed in the mold to form a ham in the shape of a turkey.

The method of making a cooked poultry product that resembles a cooked bone-in poultry product can include multiple stages, e.g., a deboning stage, a marinating stage, a molding stage and a cooking stage and a wrapping stage. In some implementations, these stages can be combined together to form a single process or may be performed separately. Within each stage are separate steps that may be optionally implemented in any alternative sequence set according to the needs of the end user. Generally, in the molding stage, the unitary meat product from the deboning stage is formed and shaped to resemble a cooked, fully-boned turkey. That is, the unitary meat product is placed within the mold so that the final unitary meat product resembles the architecture of the original fully-boned poultry product.

Deboning Stage

Figure 1:
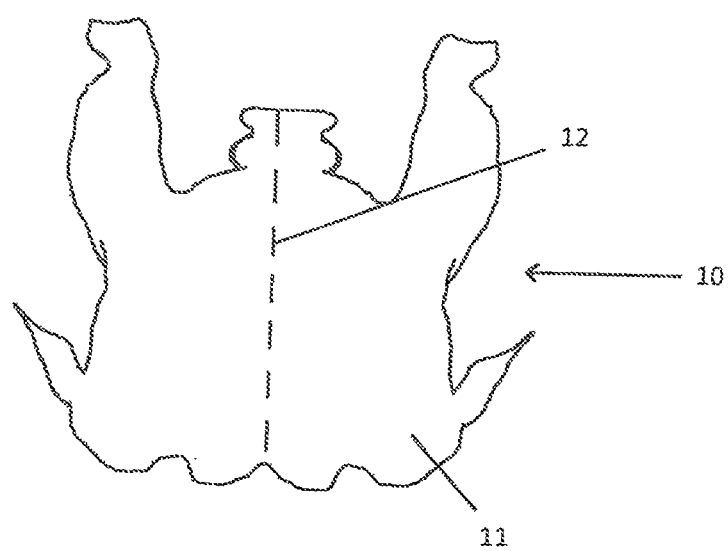
FIG. 1 shows a top view of an in-bone poultry carcass.

As shown in FIG. 1, a bone-in poultry product 10, e.g. a turkey, is provided. The poultry product 10 is typically in a range of 15-25 lbs. but any sized poultry can be used. The poultry product 10 can be deboned by splitting the back 11 of the poultry product 10 with an initial access incision 12. The poultry product 10 can be stabilized for deboning by placement on a mount, laid on a flat surface, held in place by a prepares or held with shackles as is commonly practiced in the poultry product industry. Access to the interior of the poultry product 10 for bone removal can be gained by creating the initial access incision 12. In FIG. 1, the initial access incision 12 can be made along the spine of the back 11 of the poultry product 10, but can also be done at other sites.

Figure 2:
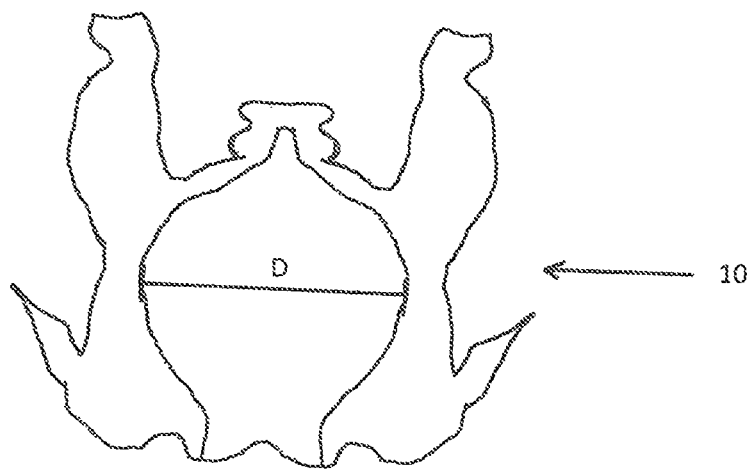
FIG. 2 shows a top view of an in-bone poultry carcass with an initial access incision.
Figure 3:
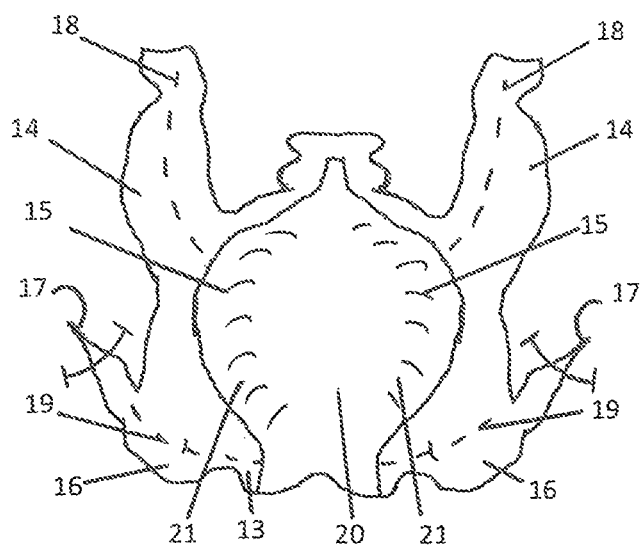
FIG. 3 shows a top view of an in-bone poultry carcass with an opened initial access incision.

As shown in FIG. 2, the poultry product 10 can be pulled open, e.g., by hand or with a prying tool by a distance D, e.g., approximately five inches wide. As shown in FIG. 3, the thigh bones 14, breast bones 15 and part of the wing bone 16 can be removed by knife or some other mechanical tool allowing the leg bones 18 and part of the wing bone 19 to remain intact. Also during this step, the wing tips 17 may also be cut off. This tip removal can be accomplished at any point throughout the deboning stage.

The removal of the above bone structures 14, 15, 16, 17 should be accomplished with minimal damage to meat of the carcass. In one implementation, once the initial access incision 12 is made, cuts for separating the meat 13 from the bones 14-17 are made through the opening. That is, cuts to the meat can be made along the back of the carcass from a base of neck to the tail of the carcass, incising all skin and fat connecting them to the bone structure. It is important to note that the meat should be continually separated as one integral poultry product.

In some implementations, the removal of the supporting bones 14-17 from the carcass can be accomplished in one cutting process. In one example, when deboning the breast area 20, the breast muscle (i.e., the pectoralis major) can be filleted on a first side of the carcass away from the ribs 21, continuing past the tenderloin (i.e., the pectoralis minor) to the base of the sternum or keel. This step is repeated on the remaining side of the carcass. From the front of the carcass, the breast muscle is loosened from the clavicle by incising on each side of the clavicle. The insertions (i.e., the tendons) of the tenderloins, right and left, are loosened by sliding the knife underneath the clavicle and cutting the tendon and muscle. The entire breast including intact skin is then pulled downward from the sternum towards the keel of the carcass using the knife tip to facilitate a smooth even removal of all meat from the frame of the carcass. Completing removal of the unitary meat portion is accomplished using a knife to cut through the smooth muscle tissue of the flank abdominal areas and removing the semi boneless product from the breast/back frame.

In some implementations, a wing joint 16 on either side of the carcass can be severed and removed by cutting through the articular cartilages and tendons of the humerus. That is, the wing bone 16 attached to the body of the carcass can be removed by pushing the neck/breast skin to the front of carcass to expose the scapular/humerus articular joint. An incision can be made through the joint and along the scapula to continue filleting meat and skin to the side. A cut is made along the diaphysis of the humerus to expose the bone. Additional cuts can be made on each side of the carcass and the humerus is removed. This process can be repeated for both sides of the carcass.

Figure 4:
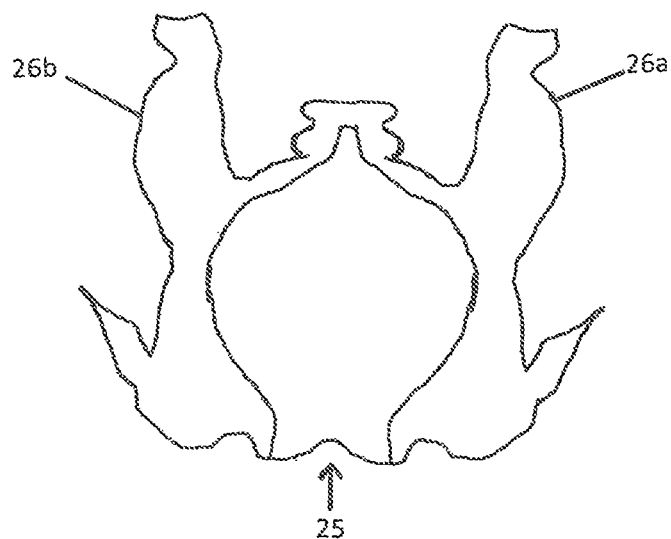
FIG. 4 shows a top view of a deboned poultry product.

In some implementations, the removal of the thigh bones 14 can be accomplished as part of the deboning stage after the meat and skin is filleted along the back. That is, a gluteus muscle can be carefully loosened by sliding a knife tip along the backbone and exposing a hip joint. Then by grasping the hock of the leg, twisting the whole leg upward and towards the center or keel area of the breast can pop the hip joint (i.e., displacement of the head of the femur from the pelvic girdle). The knife tip can then be used to cut and loosen the head of the femur. The whole leg is then lifted away from the skin towards the back and upward to expose the stifle joint. A knife cut separates the articular joint by severing the cartilage and connective tissue between the drum bone and thigh bone (i.e., displacing the femur from the tibia by severing the femoral-tibial articulation.) A cut can also be made along the diaphysis of the femur to expose the bone. Additional cuts can be made on each side and the femur is then removed. The tibia/tarsus and patella are left as a part of the unitary meat toward forming the desired end-product. This process can then be repeated on the other side of the carcass. Once completed, a deboned poultry product 25 of FIG. 4 is constructed.

In all these removal steps, care should be taken as it is preferable not to incise skin at any step of the process after the initial incision. The unitary meat portion 25 for forming the semi-boneless product is then inspected for any bone slivers or cartilage pieces. This is most easily accomplished by laying the unitary meat portion 25 onto a flat surface. The entire meat portion 25 is to be carefully inspected, particularly along the keel cartilage, and any pieces of cartilage that may still be attached are remains.

The removed bones can be set aside for further processing, as will be more fully explained hereinafter.

Marinating Stage

The deboned poultry product 25 can be placed in a solution and marinated overnight. Marination of the deboned poultry product 25 can also be done by injection or by vacuum tumbling using various levels of marinade. It can also be accomplished using solutions commonly used in marinades such as salt, sodium phosphates, lemon juice, brown sugar, starches, sodium lactates, and carrageenans. The deboned poultry product 25 may also be marinated with other flavorings or chemically treated for any reason useful in the industry for enhancing or preserving the product.

Optional Stuffing Stage

In some implementations, the deboned poultry product 25 can be stuffed. The stuffing can include trim material that is chopped fine by either manual or mechanical means into a paste. The paste can be transferred to mixers, where it is admixed with, suitable spices and fillers. The spice mixture may then be inserted into deboned poultry product cavities created by the deboning process.

Molding Stage

Figure 5:
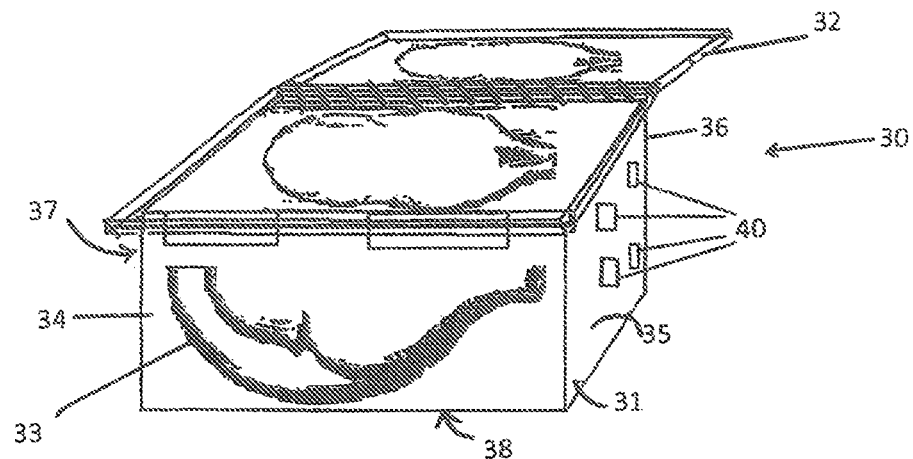
FIG. 5 shows a perspective view of an opened oven mold box.

The marinated deboned poultry product 25 can be placed in an oven mold box 30 and pressed into a shape resembling a cooked, in-bone turkey. In one implementation, referring now to FIGS. 5-6, the oven mold box 30 can include a five-sided cooking container 31, a contoured lid 32 and a contoured internal mold 33.

The five-sided cooking container 31 is of generally rectilinear overall configurations and comprises five sections, namely sides 34, 35, 36, 37 and bottom 38. The sides 34-37 can be held together by spring tension clamps (not shown) or may be crimped to one other. The top edges of the sides 34a, 35a, 36a, 37a are made for receiving the contoured internal mold described below.

The sides of the cooking container can be flat or, in some implementations, the sides can include cooking vents 40. The cooking vents 40 can allow for heat to flow through the oven mold box 30 and surround the internal mold 33. The vents 40 can be elevated aerodynamic vents so that the heat flowing on sides and on cover so that juices don't leak out as well as that the heat is evenly distributed. One side of the vent may be elevated to allow air in and on the opposite side of the vents will allow the air out.

Figure 6:
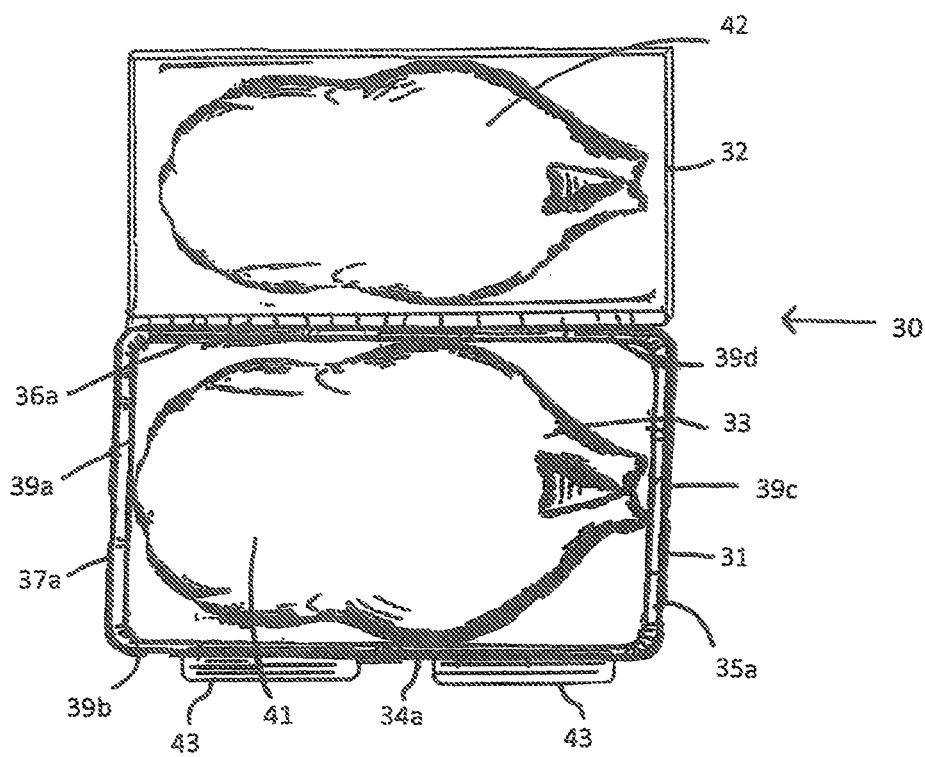
FIG. 6 shows a top view of an opened oven mold box.

As shown in FIG. 6, the contoured internal mold 33 can have an internal cavity 41 that has a shape resembling a lower portion of an in-bone turkey carcass. The outer edges 39a-d of the contoured internal mold 33 are made to be received by the top edges 34a, 35a, 36a, 37a of the cooking container 31.

The contoured lid 32 can include a cavity 42 having a shape of an upper portion of a cooked, in-bone turkey. The contoured lid can have a hinge 43 on one side 36a and clips 43 on the other side 32c to lock and press the turkey into shape. Together the contoured sections of the internal mold 33 and lid 32 form an inner hollow portion 45 having a shape that resembles a whole cooked, in-bone turkey. Also, the contoured sections of the internal mold 33 and lid 32 can be water-tight when fitted together so that the pressed turkey can be cooked in its own juices, as well as, using an optional seasoning liquid.

In use, the deboned poultry product 25 can be placed in the cavity 41 of the internal mold 33 and arranged so that the legs of the deboned poultry product 25 are visible from the top of the oven mold box 30. The lid 32 is then carefully placed so the legs 26a-b of the deboned poultry product 25 can be fitted into the cavity 42 of the lid 33. The lid 32 and the internal mold 33 are then brought together and the deboned poultry product 25 is pressed between the lid 32 and the internal mold 33 with lid 32 and the internal mold 33 being secured to one another with e.g., clamps 43.

Cooking Stage

Once the deboned poultry product 25 is pressed and locked within the oven mold box 30, the entire oven mold box 30 is placed in a cooking unit, e.g., an oven, and cooked. The oven mold box 30 can be cooked depending on the size of the turkey and the temperature of the oven. In most cases, a 201b turkey, e.g., may be cooked for 4-8 hrs at 250 to 500 degrees.

Wrapping Stage

After the deboned poultry product 25 is cooked, the oven mold box 30 is disassembled. At this point the cooked and molded poultry product 50 is ready for consumption or the fully cooked products can also be subjected to several methods of surface treatment such as addition of caramel color, impingement browning, seasoning rubs, and hot oil browning. It is to be borne in mind that while the poultry product 50 has the overall configuration of in-bone poultry product, the pressed poultry product 50 is normally of substantially smaller size than in-bone poultry product, insofar as the pressed poultry product 50 is substantially entirely composed of meat.

The fully cooked product 50 can also be sent to packaging for subsequent consumption with or without reheating. That is, the cooked product 50 can be packaged for storage, transportation or sale.

Before consumption, the product 50 may be cut into sliced portions of about ½ to 1½ inches for serving. Such sliced portions may be cut entirely from the white meat section or entirely from the dark meat sections, or a combination of white and dark meat.

Additionally, the bones 14-17 may be rendered into gravy by conventional processing and packaged in a container and sold with the poultry product 50. The gravy may be heated in conjunction with the product 50 to provide a meat and gravy combination. Thus, the entire poultry carcass is utilized in the preparation of the product 50 to be consumed, and there is full usage of the raw material without waste.

Further, although the hollow portion of the oven mold box 30 is contoured into the configuration of a turkey, it is within the scope of the present invention to form the hollow portion in any desired configuration, such as, for example, a chicken or a duck. In other implementations, other meat products, e.g., ham, can be pressed into the mold so that a turkey-shaped ham can be realized.

It can readily be realized that the mold is easy and convenient to use in that no sealing problems are encountered because the meat is all encased within the mold. Further, the mold may be lined with plastic for prevention of sanitary measures.

It will thus be seen that there is disclosed a novel product and process for making the same and while the product and process have been described in rather specific detail, it will be understood that the method may be used for any type of fowl, and minor changes may be made without departing from the spirit of the invention as defined in the appended claims.

While this specification contains many specific implementation details, these should not be construed as limitations on the scope of the disclosed technology or of what can be claimed, but rather as descriptions of features specific to particular implementations of the disclosed technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The foregoing Detailed Description is to be understood as being in every respect illustrative, but not restrictive, and the scope of the disclosed technology disclosed herein is not to be determined from the Detailed Description, but rather from the claims as interpreted according to the full breadth permitted by the patent laws. It is to be understood that the implementations shown and described herein are only illustrative of the principles of the disclosed technology and that various modifications can be implemented without departing from the scope and spirit of the disclosed technology.

What is claimed:

1. A method of producing a cooked poultry product comprising the steps of:

placing an at least semi-boneless or boneless turkey carcass into an oven mold, the oven mold having (1) a five-sided cooking container, (2) a lid with an upper mold assembly and (3) a lower mold assembly, wherein the lower mold assembly includes a first cavity for receiving a lower portion of the turkey carcass, the first cavity being in a shape of a lower portion of an in-bone turkey carcass and wherein the lid includes a second cavity for receiving an upper portion of the turkey carcass, the second cavity being in a shape of an upper portion of a cooked, in-bone turkey;

arranging the turkey carcass within the lower mold assembly of the oven mold so that legs of the turkey carcass are visible from a top of the lower mold assembly;

covering the lower mold assembly with the lid so that the legs of the turkey carcass are fitted into the second cavity of the lid;

pressing the turkey carcass between the lid and the lower mold assembly;

securing the lid onto the lower mold assembly; and heating the oven mold so as to cook the turkey carcass within a hollow portion created between the first cavity and the second cavity, wherein expansion of the turkey carcass in the oven mold due to cooking causes the turkey carcass to take the shape of the hollow portion.

2. The method of claim 1 further comprising the step of:

removing the cooked turkey carcass from the mold, the cooked turkey carcass being in the shape of a whole cooked in-bone turkey.

\* \* \* \* \*